United States Patent [19]
Kast et al.

[11] Patent Number: 5,421,652
[45] Date of Patent: Jun. 6, 1995

[54] PYROMETER ADAPTER

[75] Inventors: Howard B. Kast, West Chester; Meegada E. Prasad, Loveland, both of Ohio

[73] Assignee: General Electric Company, Cincinnati, Ohio

[21] Appl. No.: 170,599

[22] Filed: Dec. 21, 1993

[51] Int. Cl.⁶ .................. G01K 1/14; G01J 5/00; G01J 5/48; G01D 21/00
[52] U.S. Cl. .................. 374/208; 374/130; 374/144; 73/866.5; 356/44
[58] Field of Search .................. 374/130, 208, 144; 73/116, 866.5; 415/118; 356/44, 49; 248/901; 285/133.1, 138, 187; 60/39.31, 39.32

[56] References Cited

U.S. PATENT DOCUMENTS

| | | | |
|---|---|---|---|
| 3,696,678 | 10/1972 | Mossey | 73/346 |
| 4,259,866 | 4/1981 | Sleighter | 73/355 |
| 4,648,711 | 3/1987 | Zachary | 374/130 |
| 4,687,344 | 8/1987 | Lillquist | 374/124 |
| 4,825,689 | 5/1989 | Haworth et al. | 73/116 |
| 4,934,137 | 6/1990 | Mackay | 415/118 |
| 5,185,996 | 2/1993 | Smith et al. | 415/118 |
| 5,203,632 | 4/1993 | Fisher et al. | 374/144 |
| 5,211,478 | 5/1993 | Horsley | 374/208 |
| 5,237,595 | 7/1993 | Makino et al. | 364/557 |

FOREIGN PATENT DOCUMENTS 40336 3/1979 Japan .................. 60/39.32

OTHER PUBLICATIONS

Infra-red Radiation Thermometry Applied to the Development and Control of Gas Turbines-T. G. R. Beynon-High Temperature Technology-Nov., 1982-pp. 85-91.

Radiation Thermometry Applied to the Development & Control of Gas Turbine Engines-T. G. R. Beynon--Temperature its Measurement vol. 5, pp. 471-477.

*Primary Examiner*—William A. Cuchlinski, Jr.
*Assistant Examiner*—Andrew Hirshfeld
*Attorney, Agent, or Firm*—Andrew C. Hess; Bernard E. Shay

[57] ABSTRACT

In accordance with the present invention, a pyrometer adapter is disclosed for providing the optical head of a pyrometer access to a target area in a gas turbine engine, where the pyrometer adapter is subjected to relative motion between a first mounting surface and a second mounting surface, the pyrometer adapter including an outer tube having a first end mounted to the first mounting surface of the gas turbine engine and a second end terminating in a flange, and a second tube positioned radially inward of and in concentric arrangement with the outer tube, wherein the second tube extends through an opening in the first mounting surface so that the second tube is mounted at its first end to the gas turbine engine at the second mounting surface adjacent the target area and the pyrometer optical head is attached to a second end of the second tube, where the second tube also includes a flange extending from a middle portion thereof which is attached to the flange of the outer tube to form a flexible diaphragm which accommodates the relative motion between the first and second mounting surfaces.

20 Claims, 4 Drawing Sheets

PYROMETER ADAPTER

BACKGROUND OFF THE INVENTION

1. Field of the Invention

The present invention relates to a pyrometer adapter for mounting a pyrometer in a gas turbine engine, and, more specifically, to a pyrometer adapter which accommodates relative motion between two mounting surfaces in the gas turbine engine.

2. Description of Related Art

Pyrometers are well-known for the measurement of temperature at certain hot areas in a gas turbine engine, such as turbine blades. Generally, such measurement is performed by exposing the pyrometer to infrared light in the targeted area, from which the temperature is determined by the bandwidth thereof. Typical of such pyrometers is that shown in U.S. Pat. No. 4,687,344 to Lillquist.

Because the pyrometer must be able to sense the light representing the thermal energy at the targeted area, an adapter is provided to penetrate applicable casings, liners, or the like. For example, in order to determine the temperature of a turbine blade, the pyrometer must be able to penetrate the turbine casing and the outer band of the turbine nozzle. This has been done in the past by means of a pyrometer adapter which includes a sight tube retained within a socket on the nozzle outer band (such as on a boss thereof). The prior art pyrometer adapter further includes a second tube concentric with and radially outside the sight tube, with a flanged end adapted for mounting to the turbine casing.

It is well-known that the nozzle outer band and the turbine casing are made of materials having different coefficients of expansion and are physically located in different proximity with respect to the thermal energy in the turbine. Accordingly, the nozzle outer band and the turbine casing thermally grow at differing rates, which causes relative motion between the outer tube and the sight tube of the pyrometer adapter. In order to sustain or accommodate this relative motion, a spherical bearing has been utilized at the junction of the sight tube and the outer tube, which allows the sight tube and outer tube to pivot. However, as the ambient temperature of gas turbine engines has increased (approximately 1200° F.), it has been found that such a spherical bearing seizes and therefore does not reliably accommodate the relative motion. Moreover, the spherical bearing is not able to readily adjust to relative motion in three planes.

SUMMARY OF THE INVENTION

In accordance with the present invention, a pyrometer adapter is disclosed for providing the optical head of a pyrometer access to a target area in a gas turbine engine, where the pyrometer adapter has a longitudinal axis and is subjected to relative motion between a first mounting surface and a second mounting surface, the pyrometer adapter including an outer tube having a first end mounted to the first mounting surface of the gas turbine engine and a second end terminating in a flange, and a second tube positioned radially inward of and in concentric arrangement with the outer tube, wherein the second tube extends through an opening in the first mounting surface so that the second tube is mounted at its first end to the gas turbine engine at the second mounting surface and in alignment with the target area and the pyrometer optical head is attached to a second end of the second tube, where the second tube also includes a flange extending from a middle portion thereof which is attached to the flange of the outer tube to form a flexible diaphragm which accommodates the relative motion between the first and second mounting surfaces.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
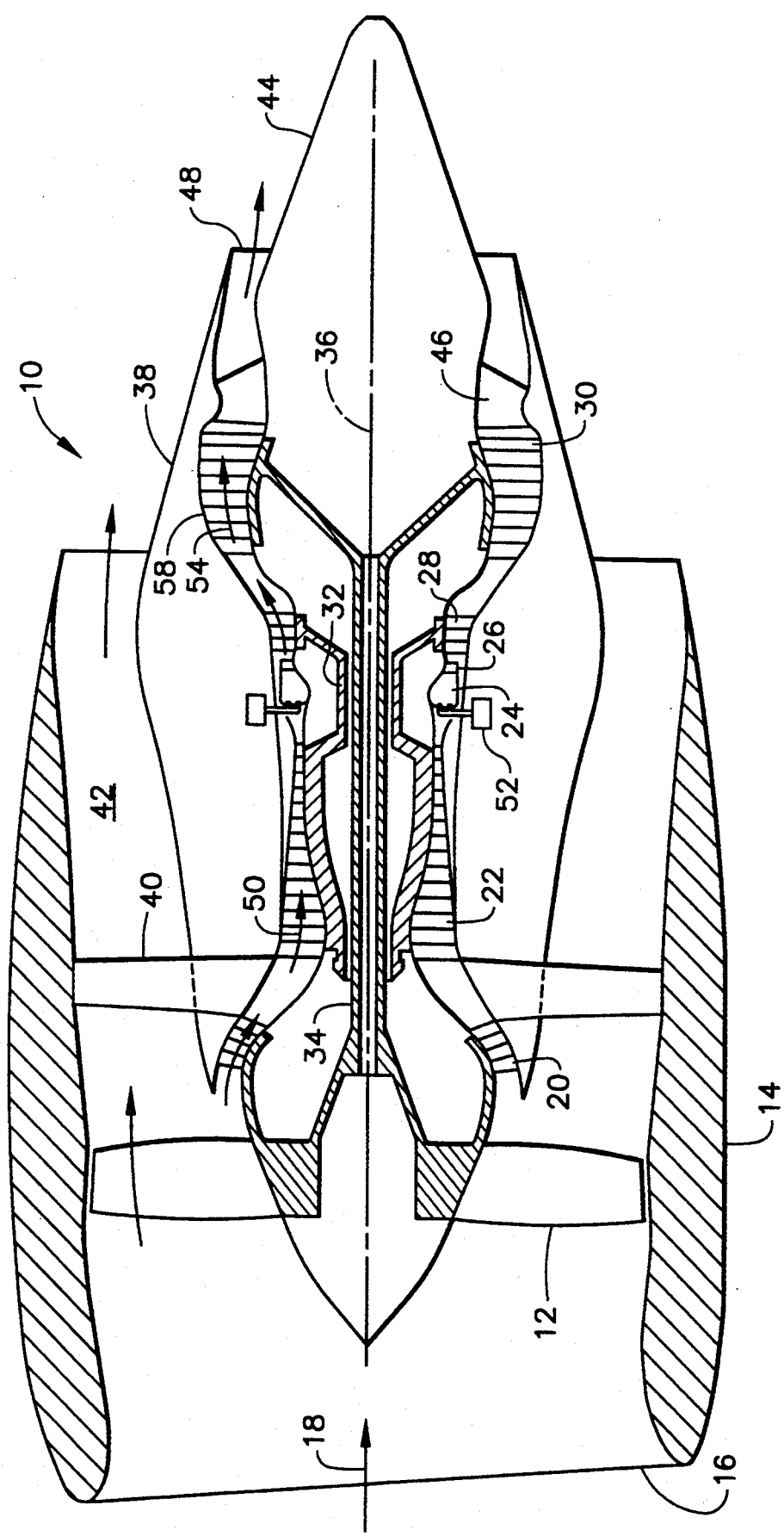
FIG. 1 is a longitudinal centerline schematic sectional view of a high bypass turbo fan engine.

Referring now to the drawings in detail, wherein identical numerals indicate the same elements throughout the figures, FIG. 1 depicts a longitudinal sectional schematic view of a high bypass turbofan engine 10. The engine 10 includes a conventional fan 12 disposed inside a fan cowl 14 having an inlet 16 for receiving ambient airflow 18. Disposed downstream of the fan 12 is a conventional low pressure compressor (LPC) 20 followed in serial flow communication by a conventional high pressure compressor (HPC) 22, a combustor 24, a conventional high pressure turbine nozzle 26, a conventional high pressure turbine (HPT) 28, and a conventional low pressure turbine (LPT) 30.

The HPT 28 is conventionally fixedly connected to the HPC 22 by an HP shaft 32, and the LPT 30 is conventionally connected to the LPC 20 by a conventional LP shaft 34. The LP shaft 34 is also conventionally fixedly connected to the fan 12. The engine 10 is symmetrical about a longitudinal centerline axis 36 disposed coaxially with the HP and LP shafts 32 and 34.

The fan cowl 14 is conventionally fixedly attached to and spaced from an outer casing 38 by a plurality of circumferentially spaced conventional struts 40 defining therebetween a conventional annular fan bypass duct 42. The outer casing 38 surrounds the engine 10 from the LPC 20 to the LPT 30. A conventional exhaust cone 44 is spaced radially inwardly from the casing 38 and downstream from the LPT 30, and is fixedly connected thereto by a plurality of conventional circumferentially spaced frame struts 46 to define an annular core outlet 48 of the engine 10.

During operation, the airflow 18 is compressed in turn by the LPC 20 and HPC 22 and is then provided as pressurized compressed airflow 50 to the combustor 24. Conventional fuel injection means 52 provide fuel to the combustor 24 which is mixed with a compressed airflow 50 and undergoes combustion in a combustor 24 for generating combustion discharge gases 54. The gases 54 flow in turn through the HPT 28 and the LPT 30 wherein energy is extracted for rotating the HP and LP shafts 32 and 34, respectively, for driving the HPC 22, and the LPC 20 and fan 12, respectively.

Figure 2:
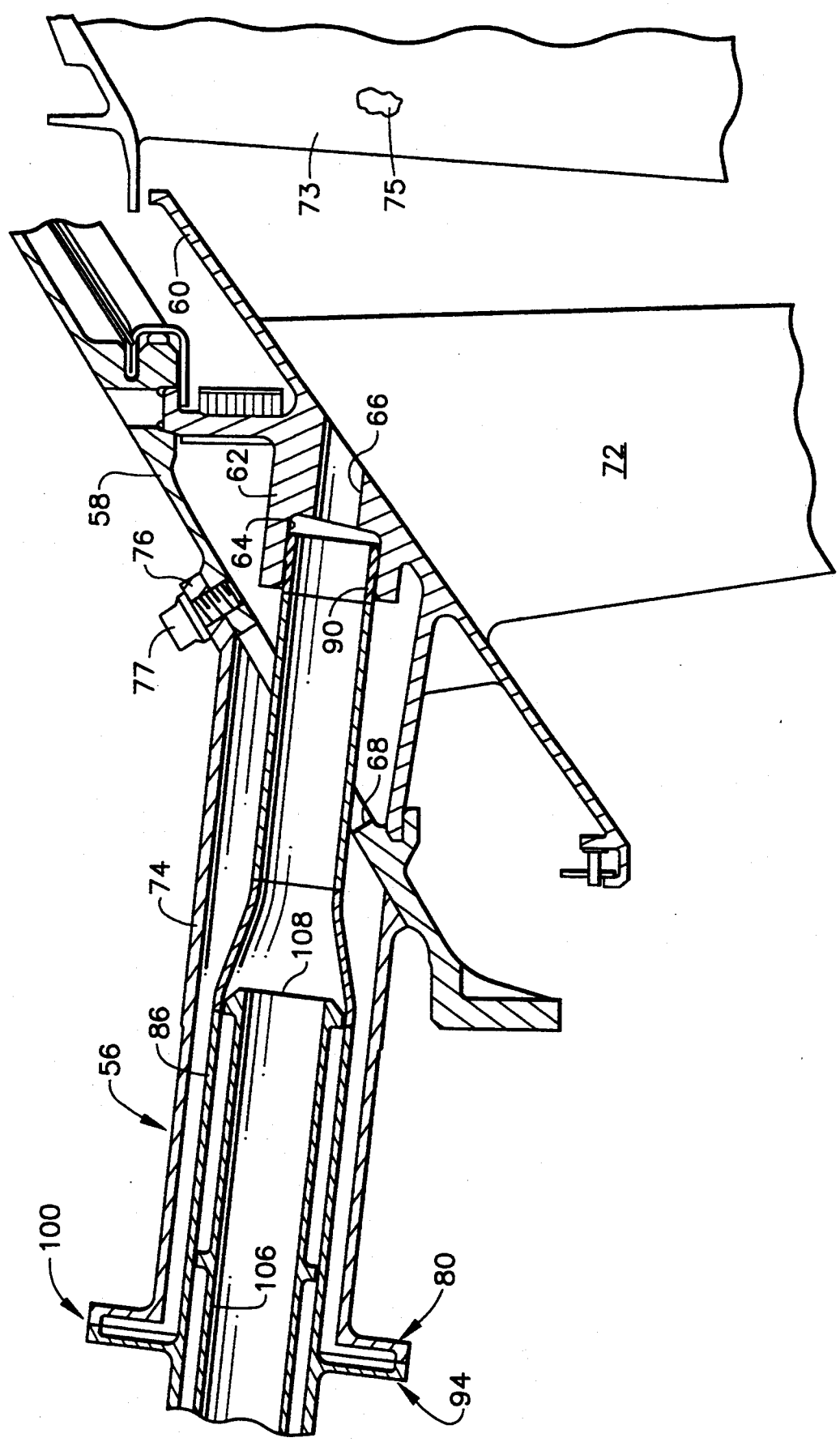
FIG. 2 is a partial cross-sectional view of the pyrometer adapter of the present invention mounted to the turbine casing and nozzle outer band of the engine depicted in FIG. 1.

FIG. 2 depicts a pyrometer adapter 56 being mounted to engine 10 at LPT casing 58 and nozzle outer band 60 of LPT 30. In particular, it will be noted that nozzle outer band 60 includes a boss 62 which has a socket 64 formed therein for receipt of pyrometer adapter 56. The opening 66 in nozzle outer band 60, as well as opening 68 in LPT casing 58 allows pyrometer adapter 56 to provide access for optical head 70 (See FIG. 3) of a pyrometer (not shown) through an LPT nozzle formed by adjacent airfoils (one of which is shown in FIG. 2 at 72) to LPT blades 73 rotating aft thereof. Accordingly, the pyrometer is able to receive light from a turbine blade 73, which is in the infrared range, through pyrometer adapter 56 to the optical head 70 of the pyrometer, where the temperature can then be measured from the bandwidth of such light. In particular, pyrometer adapter 56 is preferably in alignment with a desired target area 75 on blade 73 which is representative of the thermal effects on the entire blade.

The LPT casing 58 acts as a first mounting surface for pyrometer adapter 56 and nozzle outer band 60 acts as a second mounting surface for pyrometer adapter 56. It is well-known that the materials utilized for LPT casing 58 and nozzle outer band 60 generally have different coefficients of expansion. Because LPT casing 58 and nozzle outer band 60 are made of different materials and clearly are in different proximities to the thermal effects from the inside of LPT 30, each of these components experiences differing thermal growth rates. Accordingly, relative motion takes place between LPT casing 58 and nozzle outer band 60; therefore, the first and second mounting surfaces for pyrometer adapter 56 cause such relative motion to be experienced by pyrometer adapter 56.

Figure 3:
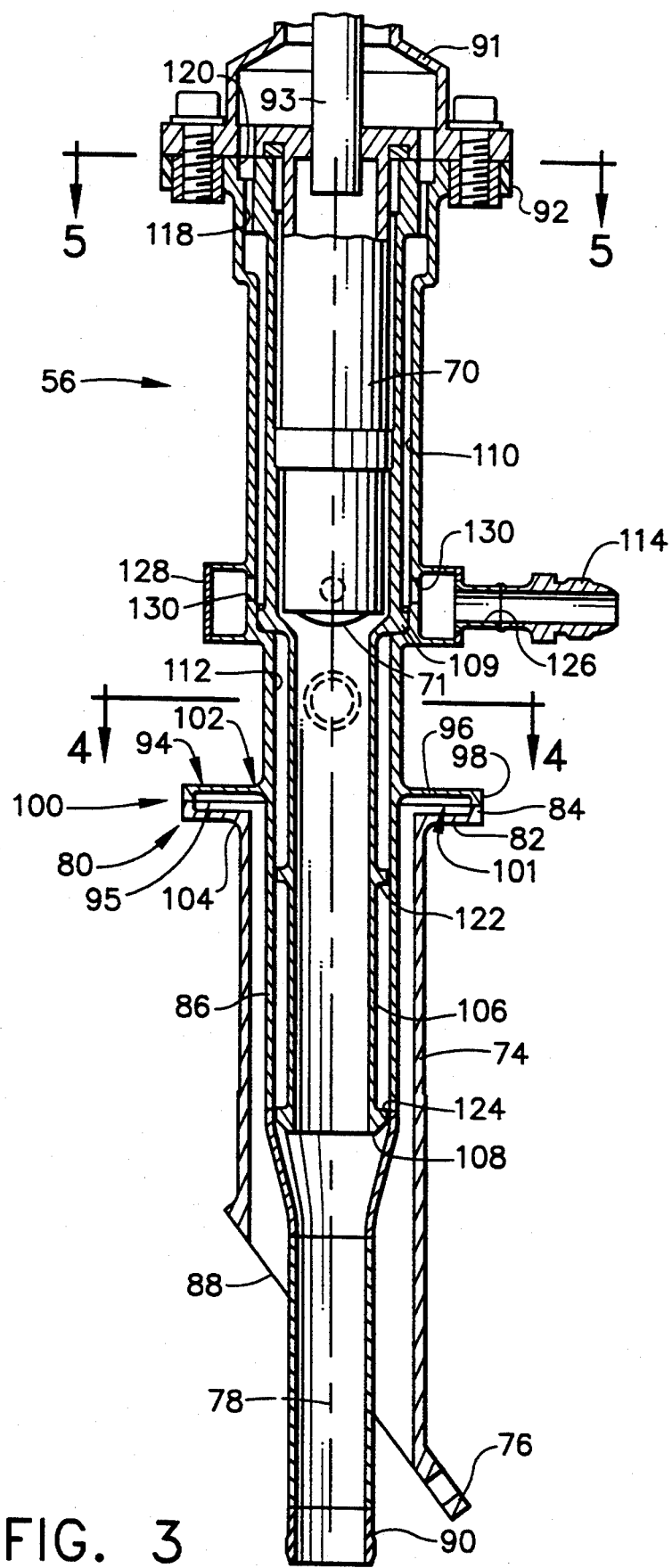
FIG. 3 is a cross-sectional view of the pyrometer adapter of the present invention.
Figure 4:
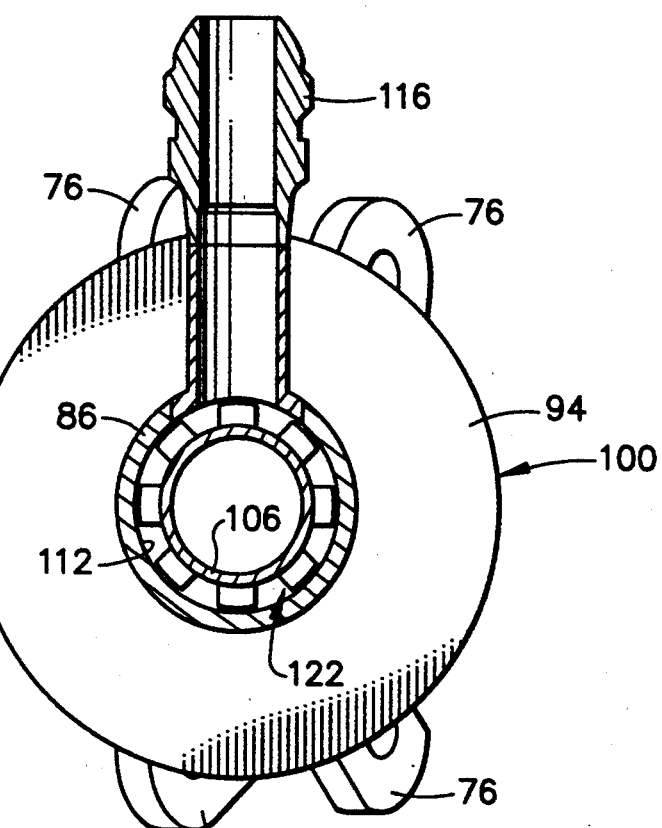
FIG. 4 is a sectional view of the pyrometer adapter taken across line 4—4 in FIG. 3.
Figure 5:
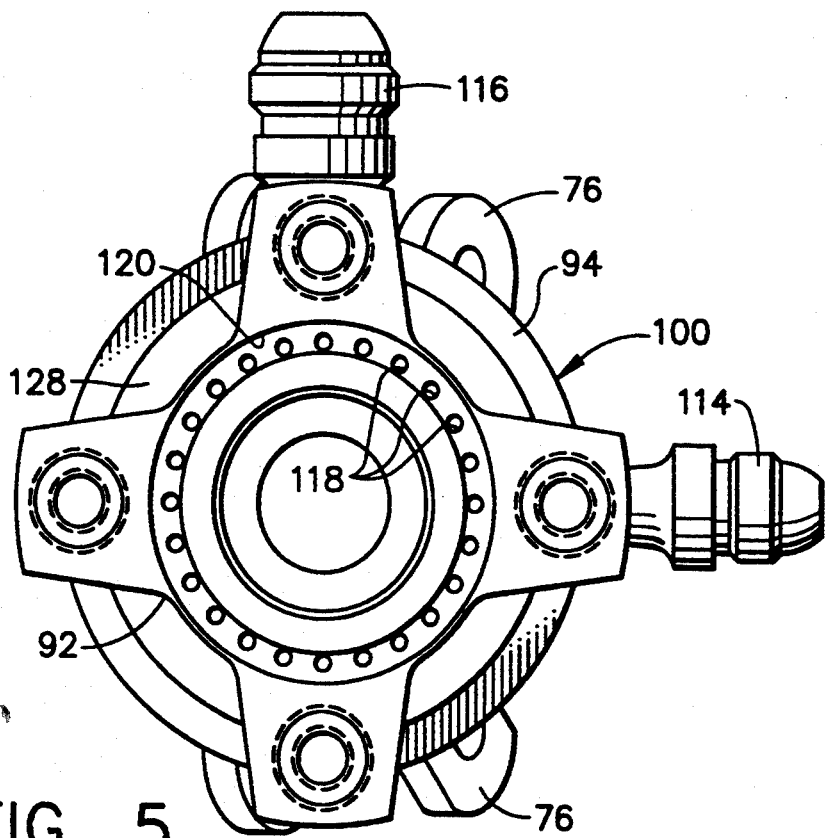
FIG. 5 is a top view of the pyrometer adapter shown in FIG. 3.

As best seen in FIG. 3, pyrometer adapter 56 includes an outer tube 74 which has a first end 76 that mounts to LPT casing 58 by means of bolts 77 (see FIG. 2) or other similar means. In order to accommodate the desired mounting arrangement, outer tube 74 may terminate at end 76 in a truncated frustum, i.e., at an angle to a longitudinal axis 78 of pyrometer adapter 56. Outer tube 74 also includes a flexible flange 80 at its other end, which preferably is circular. Flange 80 of outer tube 74 preferably includes a first portion 82 which is substantially perpendicular to longitudinal axis 78 and a second portion 84 which is substantially parallel to axis 78.

Pyrometer adapter 56 further includes a second tube 86, known as a sight tube, which is concentric with outer tube 74 and lies radially inward of (has a smaller diameter than) outer tube 74. Sight tube 86 is designed to extend through a plane 88 defined by end 76 of outer tube 74, where it can extend through opening 68 in LPT casing 58 and into socket 64 of nozzle outer band 60 (as shown in FIG. 2). From there, sight tube 86 is able to transmit infrared light to the pyrometer from target area 75 by aligning with the turbine nozzle between airfoils 72. While sight tube 86 generally is comprised of Inconel 625 material, it may be preferred to utilize some other exotic material, such as a steel alloy known as L605, at the tip 90 thereof. Such an exotic material would be utilized in order to better sustain the exposure to the thermal energy within LPT 30. The sight tube 86 extends parallel to axis 78 of pyrometer adapter 56 and terminates at a flange 92 which may be utilized for attaching optical head 70 to pyrometer adapter 56.

Sight tube 86 further includes a flexible flange 94, which preferably is circular, at a point along its body where it is able to attach to flexible flange 80 of outer tube 74. In this regard, flange 94 of sight tube 86 preferably includes a first portion 96 which extends substantially perpendicular to axis 78 and a second portion 98 which is substantially parallel to axis 78. Then, second portion 98 of flange 94 and second portion 84 of flange 80 are preferably attached, such as by welding. In this manner, a flexible diaphragm 100 is formed which includes an air cavity 101 between flanges 94 and 80. Preferably, the dimensions of flexible flanges 80 and 94 are selected such that the maximum stress at flexible diaphragm 100 is not at the weld 95.

Flexible diaphragm 100 is then utilized to accommodate the relative motion experienced by pyrometer adapter 56, caused by the relative motion between LPT casing 58 and nozzle outer band 60. By forming flexible diaphragm 100 as an integral connection between outer tube 74 and sight tube 86, flexible diaphragm 100 not only is able to sustain higher ambient temperatures flowing in engine 10, but is also able to accommodate relative motion in three planes. Accordingly, flexible diaphragm 100 is able to accommodate motion parallel to longitudinal axis 78 if sight tube tip 90 seizes within socket 64, as well as at angles to longitudinal axis 78. In addition, the integral nature of flexible diaphragm 100 restricts twisting of pyrometer adapter 56 circumferentially about longitudinal axis 78. It will be noted that stress will particularly be felt by flexible diaphragm 100 at joints 102 and 104, but such stress joints are made of a material (e.g., Inconel 625 or a stainless steel alloy) having a yield strength which is greater than the range of stresses imposed thereon.

Pyrometer adapter 56 also preferably includes an inner tube 106, which is concentric with and lies radially inward of (has a diameter smaller than) sight tube 86. As seen in FIG. 3, inner tube 106 is joined to sight tube 86 which together form flange 92. Inner tube 106 also extends partially through sight tube 86 to a tip 108. It will be noted that the diameter of sight tube 86 is gradually reduced as it extends past tip 108 of inner tube 106. This gradual reduction of the sight tube diameter continues until it is preferably approximately the same as the diameter of inner tube 106. Due to the respective radii of inner tube 106 and sight tube 86, an annular passage is formed therebetween. Shoulder 109 is provided on inner tube 106 in order to divide the annular passage therebetween into an upper annular passage 110 and a lower annular passage 112. In this manner, cool air may be introduced into upper annular passage 110 through a fitting 114 and hot purge air may be introduced into lower annular passage 112 by means of a fitting 116. Cool air supplied to upper annular passage 110 is utilized to keep optical head 70 of the pyrometer cool, and in fact extends through flange 92 into a jacket 91 which cools a fiberoptic cable 93 connecting optical head 70 with the electronic unit (not shown) of the pyrometer. In this regard, it will be understood that several passages 118 are provided about flange 92 which allows the cool air to flow to a groove 120 ground within flange 92 and thereafter into jacket 91 for a distance (approximately half way to the pyrometer electronics). In order to sustain cool air flow, the total area of passages 118 will preferably be greater than the area of tube 126 in cool air fitting 114 which supplies cool air to a cool air shroud 128. A passage 130 then connects cool air shroud 128 to upper annular passage 110.

Lower annular passage 112 is utilized to provide hot purge air to the lower portion of sight tube 86. This hot purge air prevents turbine gases containing dirt and other debris from entering sight tube 86 and inner tube 106, and thereby helps maintain the lens 71 of optical head 70 clean. In order to assist in this hot purge flow, diffusers 122 and 124 are provided midway between shoulder 109 of inner tube 106 and tip 108 of inner tube 106 as well as at tip 108, respectively.

Having shown and described the preferred embodiment of the present invention, further adaptations of the pyrometer adapter 56 accommodating relative motion between its mounting surfaces, as well as for providing cool air to the optical head 70 of the pyrometer and any fiberoptic cable can be accomplished by appropriate modifications by one of ordinary skill in the art without departing from the scope of the invention. For example, while the flexible diaphragm 100 formed by the sight tube 86 and outer tube 74 is depicted as being positioned approximately at the mid-portion of sight tube 86, such flexible diaphragm 100 may be formed at various other locations of sight tube 86 by merely lengthening or shortening outer tube 74.

What is claimed is:

1. An apparatus for providing an optical head of a pyrometer access to a target area in a gas turbine engine, wherein said apparatus has a longitudinal axis and is subjected to relative motion between a first mounting surface and a second mounting surface, comprising:
   (a) a first tube having a first end and a second end, said first end being mounted to said gas turbine engine at said first mounting surface and said second end terminating in a flange; and
   (b) a second tube having a first end and a second end, said second tube being in concentric arrangement with and radially inward from said first tube, wherein said second tube extends through an opening in said first mounting surface so that said second tube first end is mounted to said gas turbine engine at said second mounting surface adjacent said target area, said second tube second end being adapted for mounting said pyrometer optical head thereto, and said second tube further including a flange extending from a middle portion thereof, said second tube flange being attached to said first tube flange to form a flexible diaphragm;
   whereby said relative motion between said first and second mounting surfaces is accommodated by said flexible diaphragm.

2. The apparatus of claim 1, further comprising a third tube concentric with and radially inward of said second tube, said third tube having a first end attached to said second tube second end and a second end which terminates between said second tube first end and said flexible diaphragm, wherein an annular passage is provided between said second tube and said third tube.

3. The apparatus of claim 2, further comprising a shoulder in said third tube so as to divide said annular passage into an upper passage and a lower passage.

4. The apparatus of claim 3, further comprising means for accepting cooling air into said upper annular passage.

5. The apparatus of claim 3, further comprising means for accepting hot purge air into said lower annular passage.

6. The apparatus of claim 1, wherein said first mounting surface is a turbine casing.

7. The apparatus of claim 6, wherein said second mounting surface is an nozzle outer band.

8. The apparatus of claim 1, wherein the first end of said first tube is a truncated frustum to allow mounting of said apparatus at an angle to said first mounting surface.

9. The apparatus of claim 5, wherein a plurality of diffusers are provided in said lower annular passage.

10. The apparatus of claim 1, wherein said second tube first end is comprised of a material different from the remaining portions of said second tube.

11. The apparatus of claim 1, wherein said flexible diaphragm is able to absorb relative motion between said first and second mounting surfaces in three planes.

12. The apparatus of claim 1, wherein an air cavity is provided between said first and second tube flanges.

13. The apparatus of claim 1, wherein stress imposed on joints connecting said first and second tube flanges to said first and second tubes, respectively, caused by said relative motion between said first and second mounting surfaces, is within the strength of the material used for said first and second tubes.

14. The apparatus of claim 4, wherein said upper annular passage extends through a junction of said second and third tubes as a plurality of passages which have a total area greater than the area of said accepting means allowing cool air to be provided in said upper annular passages.

15. The apparatus of claim 2, wherein the diameter of said second tube is gradually reduced past said third tube second end.

16. The apparatus of claim 15, wherein said reduced diameter of said second tube is approximately the same as the diameter of said third tube.

17. The apparatus of claim 1, wherein said flanges on said first and second tubes are circular.

18. The apparatus of claim 1, wherein said flanges on said first and second tubes include a first portion substantially perpendicular to said longitudinal axis and a second portion substantially parallel to said longitudinal axis, wherein the respective second portions of said flanges are joined and a cavity is formed therebetween.

19. The apparatus of claim 9, wherein said plurality of diffusers are provided in said lower annular passage adjacent the second end of said third tube.

20. An adapter for providing an optical head of a pyrometer access through a turbine nozzle in a gas turbine engine to blades rotating therebehind wherein said adapter is subjected to relative motion between a turbine casing and an outer band of said turbine nozzle, comprising:
   (a) an outer tube having a first end mounted to said turbine casing and a second end terminating in a flexible diaphragm;
   (b) a sight tube in concentric arrangement with and radially inwardly from said outer tube, said sight tube extending through an opening in said turbine casing so that a first end of said sight tube is mounted to said nozzle outer band and in alignment with an opening in said nozzle outer band, said sight tube having a second end terminating in a flange for mounting said pyrometer optical head thereto and including a flexible diaphragm extending from a middle portion between said sight tube first and second ends, wherein said outer tube flexible diaphragm is attached to said sight tube flexible diaphragm;
   whereby relative motion between said turbine casing and said nozzle outer band is accommodated by said flexible diaphragms.

* * * * *